US012340311B2

United States Patent
Thadani et al.

(10) Patent No.: US 12,340,311 B2
(45) Date of Patent: *Jun. 24, 2025

(54) RANKING USER COMMENTS ON MEDIA USING REINFORCEMENT LEARNING OPTIMIZING FOR SESSION DWELL TIME

(71) Applicant: Yahoo Assets LLC, New York, NY (US)

(72) Inventors: Kapil Thadani, New York, NY (US); Akshay Soni, New York, NY (US); Parikshit Shah, New York, NY (US); Troy Chevalier, New York, NY (US); Sreekanth Ramakrishnan, New York, NY (US); Aaron Nagao, New York, NY (US); Zhi Qu, New York, NY (US)

(73) Assignee: Yahoo Assets LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,499

(22) Filed: Apr. 10, 2023

(65) Prior Publication Data

US 2023/0244937 A1  Aug. 3, 2023

Related U.S. Application Data

(63) Continuation of application No. 16/446,480, filed on Jun. 19, 2019, now Pat. No. 11,625,599.

(51) Int. Cl.
*G06N 3/08* (2023.01)
*G06F 16/2457* (2019.01)
(Continued)

(52) U.S. Cl.
CPC ......... *G06N 3/08* (2013.01); *G06F 16/24578* (2019.01); *G06F 40/216* (2020.01);
(Continued)

(58) Field of Classification Search
CPC ........... G06N 3/08; G06N 7/005; G06N 3/02; G06N 7/023; G06N 7/026; G06N 3/084;
(Continued)

(56) References Cited

U.S. PATENT DOCUMENTS

2018/0219830 A1*  8/2018  O'Brien .............. H04L 61/5007
2019/0108561 A1*  4/2019  Shivashankar ......... G06F 17/18
(Continued)

*Primary Examiner* — Quoc A Tran
(74) *Attorney, Agent, or Firm* — Cooper Legal Group LLC

(57) ABSTRACT

A method is provided, including: storing comments generated in response to a content item served over a network; analyzing the comments to determine features associated with each of the comments; using a scoring model to score each comment based on the comment's corresponding features; receiving a request to serve a subset of the comments; responsive to the request, selecting a ranking of the comments that is one permutation from possible rankings of the comments, wherein selecting the ranking is in accordance with a probability distribution of the possible rankings that is based on the scores of the comments; serving comments identified by the selected ranking over the network to a client device; determining a dwell time on the served comments; applying the dwell time to update the scoring model.

20 Claims, 3 Drawing Sheets

(51) Int. Cl.
*G06F 16/338* (2019.01)
*G06F 40/216* (2020.01)
*G06N 3/006* (2023.01)
*G06N 3/02* (2006.01)
*G06N 3/084* (2023.01)
*G06N 7/01* (2023.01)
*G06N 7/02* (2006.01)

(52) U.S. Cl.
CPC ............. *G06N 7/01* (2023.01); *G06F 16/338* (2019.01); *G06N 3/006* (2013.01); *G06N 3/02* (2013.01); *G06N 3/084* (2013.01); *G06N 7/023* (2013.01); *G06N 7/026* (2013.01)

(58) Field of Classification Search
CPC . G06N 3/006; G06F 16/24578; G06F 40/216; G06F 16/338
See application file for complete search history.

(56) References Cited

U.S. PATENT DOCUMENTS

2019/0325267 A1* 10/2019 Chen ................... G06F 18/2415
2020/0210499 A1* 7/2020 Huang .................. G06F 16/958

* cited by examiner

RANKING USER COMMENTS ON MEDIA USING REINFORCEMENT LEARNING OPTIMIZING FOR SESSION DWELL TIME

RELATED APPLICATION

This application claims priority to and is a continuation of U.S. application Ser. No. 16/446,480, filed on Jun. 19, 2019, entitled "RANKING USER COMMENTS ON MEDIA USING REINFORCEMENT LEARNING OPTIMIZING FOR SESSION DWELL TIME", which is incorporated by reference herein in its entirety.

BACKGROUND

1. Field of the Disclosure

The present disclosure relates to methods and systems for ranking user comments on media using reinforcement learning optimizing for session dwell time.

2. Description of the Related Art

In order to foster community and discussion on an Internet content platform, many Internet content providers provide commenting systems that enable users to write comments and react to previously written comments. However, given the scope and scale of the Internet, it is quite possible that a single article will garner thousands of comments. As no single user will read all such comments, this presents a challenge of how to determine which comments should be served with a given content item at any given time.

It is in this context that implementations of the disclosure arise.

SUMMARY

Implementations of the present disclosure provide methods and systems for ranking user comments on media using reinforcement learning optimizing for session dwell time.

In some implementations, a method is provided, including: storing comments generated in response to a content item served over a network; analyzing the comments to determine features associated with each of the comments; using a scoring model to score each comment based on the comment's corresponding features; receiving a request to serve a subset of the comments; responsive to the request, selecting a ranking of the comments that is one permutation from possible rankings of the comments, wherein selecting the ranking is in accordance with a probability distribution of the possible rankings that is based on the scores of the comments; serving comments identified by the selected ranking over the network to a client device; determining a dwell time on the served comments; applying the dwell time to update the scoring model.

It will be appreciated that each permutation from possible rankings defines a unique order for at least some of the comments.

In some implementations, the features include statistics based on one or more of replies, upvotes, downvotes, and age.

In some implementations, the scoring model includes a neural network.

In some implementations, updating the scoring model includes adjusting one or more weights of the neural network.

In some implementations, updating the scoring model is configured to adjust the scoring model to maximize the dwell time of users on comments ordered according to their scores as determined by the scoring model.

In some implementations, the scoring model is configured to provide for a given comment a score indicating the relative contribution of that comment to an optimized ranking. In some implementations, the score indicates the relative chance that the given comment should be selected for the first position in the ranking.

In some implementations, the probability distribution is defined from probabilities of the permutations of possible rankings, such that a given ranking prioritizing comments predicted to have greater dwell time has a higher probability than a given ranking prioritizing comments predicted to have a lower dwell time, as determined from the scoring of each comment.

In some implementations, the dwell time defines a reward for reinforcement learning of the scoring model.

In some implementations, the request is generated from an access to the content item.

In some implementations, selecting the ranking includes sequentially defining a multinomial distribution and sampling from the multinomial distribution.

In some implementations, determining the dwell time includes tracking a quantity of time that the served comments are presented at the client device.

In some implementations, a non-transitory computer readable medium having program instructions embodied thereon is provided, the program instructions being configured, when executed by a computing device, to cause the computing device to perform the following operations: storing comments generated in response to a content item served over a network; analyzing the comments to determine features associated with each of the comments; using a scoring model to score each comment based on the comment's corresponding features; receiving a request to serve a subset of the comments; responsive to the request, selecting a ranking of the comments that is one permutation from possible rankings of the comments, wherein selecting the ranking is in accordance with a probability distribution of the possible rankings that is based on the scores of the comments; serving comments identified by the selected ranking over the network to a client device; determining a dwell time over the served comments; applying the dwell time to update the scoring model.

20. A system comprising at least one server computer is provided, the at least one server computer having: logic for storing comments generated in response to a content item served over a network; logic for analyzing the comments to determine features associated with each of the comments; logic for using a scoring model to score each comment based on the comment's corresponding features; receiving a request to serve a subset of the comments; logic for, responsive to the request, selecting a ranking of the comments that is one permutation from possible rankings of the comments, wherein selecting the ranking is in accordance with a probability distribution of the possible rankings that is based on the scores of the comments; logic for serving comments identified by the selected ranking over the network to a client device; logic for determining a dwell time on the served comments; logic for applying the dwell time to update the scoring model.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
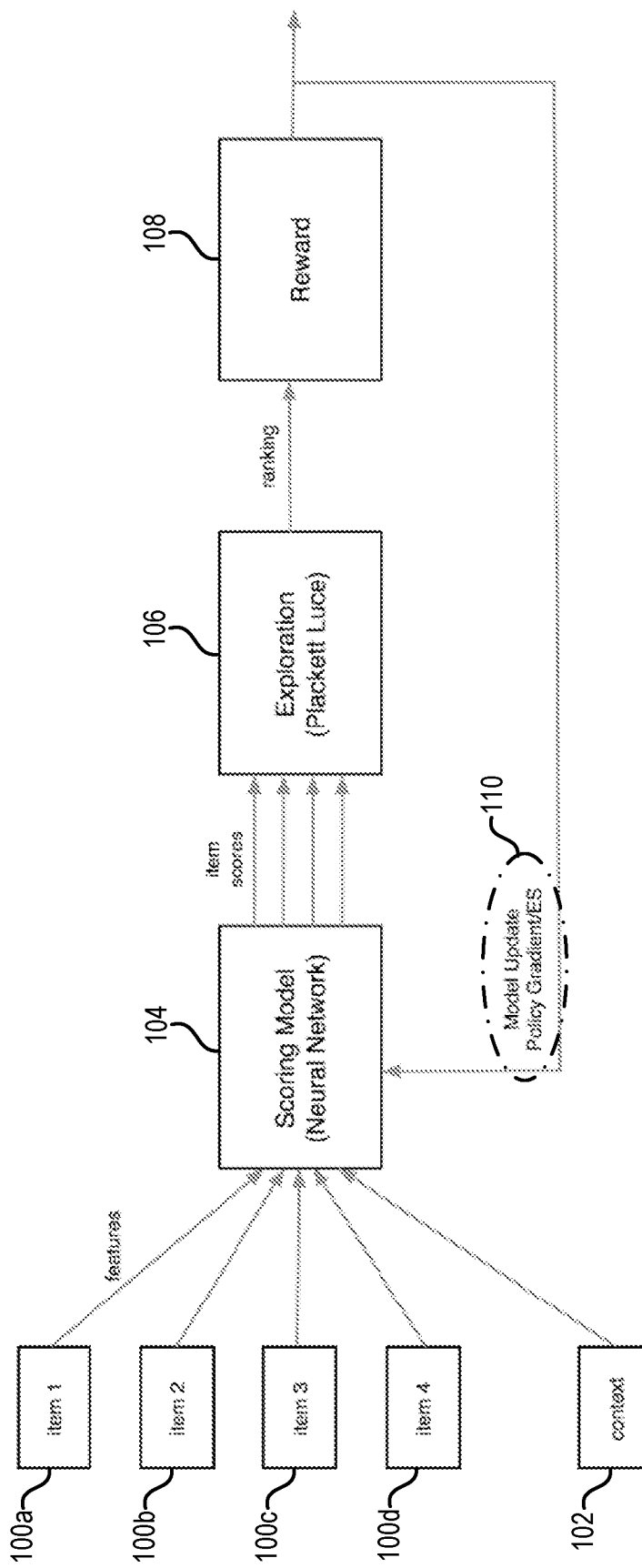
FIG. 1 conceptually illustrates a method for using a reinforcement learning model to rank comments for serving to users, in accordance with implementations of the disclosure.

The following implementations describe systems and methods for building user profiles using relevance feedback. It will be obvious, however, to one skilled in the art, that the present disclosure may be practiced without some or all of these specific details. In other instances, well known process operations have not been described in detail in order not to unnecessarily obscure the present disclosure.

Subject matter will now be described more fully hereinafter with reference to the accompanying drawings, which form a part hereof, and which show, by way of illustration, specific example implementations. Subject matter may, however, be embodied in a variety of different forms and, therefore, covered or claimed subject matter is intended to be construed as not being limited to any example implementations set forth herein; example implementations are provided merely to be illustrative. Likewise, a reasonably broad scope for claimed or covered subject matter is intended. Among other things, for example, subject matter may be embodied as methods, devices, components, or systems. Accordingly, implementations may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. It is intended, for example, that claimed subject matter include combinations of example implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Internet properties such as news sites, social networks, and various websites and apps, allow users to comment on content/articles. However, there can be thousands of comments for a given piece of content. And in addition to the sheer number of comments, many comments are toxic to the platform, including personal attacks, "trolling," racist content, controversial content posted by bots, name-calling, etc. Such toxic comments lead to a negative user experience, and may cause users to disengage, perhaps even leaving the platform altogether or deleting the app. Thus, it is a challenge to determine which comments should be served to users, further complicated by the need to both add and serve comments at scale in real time.

The top comments should ideally be relevant, non-toxic, and engaging to most people. However, existing ranking schemes for comments are typically simplistic, accounting for little more than time and/or user votes (e.g. upvotes and/or downvotes). Such ranking schemes are thus not easily tuned to improve high-level performance indicators such as engagement or retention. Furthermore, existing ranking models that are trained offline can quickly grow stale as the data and user preferences drift over time, so models need to be re-tuned regularly. Moreover, capturing user preferences for rankings is also challenging as most users only interact with the top-ranked comments, rendering it difficult to gather unbiased user preferences for the remaining comments.

In view of the above, implementations of the disclosure provide a ranking system for comments that employs reinforcement learning to overcome the limitations of existing ranking schemes. The system employs a scoring model that can be trained directly to optimize engagement metrics such as user dwell time, and this objective can be changed over time in response to product goals without re-training. The scoring model is configured to learn continuously from recent user interactions with comment threads and thus adapts to changing data and user preferences. Rankings presented to users are sampled from permutation distributions, enabling sample-efficient learning over a large number of possible rankings without the need for additional exploration. Furthermore, the ranking system is flexible and makes few restrictive assumptions, enabling the incorporation of additional features, arbitrary loss functions and even personalization.

FIG. 1 conceptually illustrates a method for using a reinforcement learning model to rank comments for serving to users, in accordance with implementations of the disclosure.

Broadly speaking, the reinforcement learning method is configured to produce a ranking of comments in order to maximize a reward, which can be summarized as follows. At a given time, the ranking system is presented with a set of comments having various features which can be represented as feature vectors for processing. Given the feature vectors, the system ranks the comments and presents them to the user. The user views the comments in their ranked order, and reacts in some way that is measurable as a scalar reward (e.g. dwell time) for the particular ranking. This reward is processed and used to update the ranking mechanism in order to maximize the reward.

Existing ranking systems are prone to exposure/position bias, whereby items that are highly ranked tend to be reinforced due to greater exposure stemming from their high ranking position. In other words, a comment that is highly ranked, and which appears in a prime position due to its high ranking, will have greater exposure that tends to reinforce its high ranking as users see it and continue to react favorably to it. This comes at the expense of other comments that may be of a high quality, but whose ranking will never reflect this due to inadequate exposure.

Therefore, to combat exposure bias, implementations of the present disclosure employ a probabilistic approach to the overall reward generating process. The environment generates the contexts by sampling from a distribution. Given the context, there are N! different rankings possible for the N items, each corresponding to one arm in a contextual bandits framework. An arm (or a specific ranking) is chosen according to a distribution over all possible permutations of the N items. That is, the ranking/permutation is chosen at a given instant in accordance with the probability distribution of all possible rankings/permutations. The chosen ranking is presented to the user who examines the content and its ranking, giving a reward, e.g. in the form of dwell time. This reward is passed back as a feedback to the system, which seeks to find the policy that maximizes the expected reward (e.g. maximizes the expected dwell time).

Comments can be ranked using various features of the comments, including raw features such as the number of upvotes (e.g. thumbs-up, like, etc.), downvotes (e.g. thumbs-down, dislike, etc.), replies, re-shares (e.g. sharing to a social network, e-mailing, etc.), reports of abuse (e.g. "flagging" as abusive, etc.), reactions (e.g. positive, negative, happy, sad, angry, etc.), and other user-generated indications of the quality of a given comment. Furthermore, additional features can be derived from analyzing comments, such as a toxicity score which measures how hateful a comment is, based on detection of such incidences as racial slurs, death threats, and personal attacks.

Existing ranking systems have generally used a weighted combination of features, such as those described above, to generate a score indicating the overall goodness of a comment. However, in such systems the weights are typically manually set, and tuning model parameters manually to recover good rankings is time consuming. Further, such models have not been specifically optimized to increase engagement measures such as user dwell time. It may seem that these limitations can be avoided by collecting user engagement data and using machine learning to train a prediction model that estimates the dwell-time accurately. However, such machine learning relies on instructive learning where the ground truth is known. But for ranking tasks, where a list of items is a data-point, it is not known in advance that which particular ranking would be the best; hence instructive training is not ideal. By contrast, in present implementations, explorative learning is carried out where the model decides to engage in permanent exploration in order to continuously improve. In particular, reinforcement learning is used to learn a policy for ranking comment threads using the dwell time of users on the thread as a reward.

With continued reference to FIG. 1, the reinforcement learning method is described. Various comments 100a, 100b, 100c, 100d, etc. and a context 102 are presented for evaluation. More specifically, the comment features and context define parameters which are scored using a scoring model 104 (e.g. a neural network). In some implementations, scoring is configured so that a higher value for a particular index indicates that the corresponding item should be placed at a higher position than the ones that have a lower score. Based on the scores for the various comments, a probabilistic model over all possible rankings (permutations) of these items is introduced.

A ranking-probability model is configured to enable computation of the probability of any given ranking (specific ordering of the comments). It further enables sampling of a ranking from this distribution, and the distribution function is differentiable. To accomplish this, an exploration step 106 utilizes a Plackett-Luce ranking distribution. For example, for the ranking of N comments with N scores, the Plackett-Luce framework enables determination of the probability of a given ranking (given ordering of the comments), as based on the scores for the various comments as described above. That is, given the scoring of the comments, a ranking prioritizing higher scoring comments will have a greater probability of occurrence than a ranking prioritizing lower scoring comments. In this manner, a distribution of the possible rankings based on their probabilities can be defined. And further, specific rankings presented to users (i.e. specific orderings of comments) are sampled in accordance with, or from, this distribution. Thus, after scoring by the scoring model 104, the exploration step 106 ensures that comments are not simply presented in decreasing order of score (as would be the case if only their scores were considered), but that a probabilistic element is introduced so that while high scoring comments are likely to be highly ranked for presentation most of the time (or with high probability), there is some non-trivial probability that lower scoring comments will be ranked more highly than their scores would suggest, enabling exposure of such comments, and counteracting the impact of exposure bias in the overall method.

Another aspect is how to sample a ranking from the Plackett-Luce distribution given a set of scores for a set of comments. In some implementations, a sequential procedure is implemented where the rank-1 element (e.g. comment) is first determined, followed by the rank-2 element, and so on. For example, starting with all the items given by a set S then a multinomial probability distribution is defined over the set S. The first element is sampled from this multinomial distribution. Then a new set S is created by keeping all but the sampled first element, and again a multinomial distribution is defined on this set followed by sampling to find the second element, and so on until the entire ranking is generated. For a given generated ranking, comments are served in accordance with the order defined by the generated ranking, and the reward (e.g. dwell time) is captured. This information is used to update/optimize the scoring model.

To update the scoring model, an implementation of a policy gradient algorithm is applied. The policy gradient (PG) algorithm converts the policy search problem into an optimization problem. It works by repeatedly estimating the gradient of the policy's performance (reward) with respect to its parameters followed by gradient ascent to find parameters that can increase the expected rewards. It is possible to estimate the gradient of the reward by a sampling based approach where for m different contexts, the current policy can be used to generate actions, and observe m rewards. It is then possible to create an unbiased estimate of the gradient empirically.

The gradient approximation is empirically computed by sampling many rankings given contexts and collecting rewards for those rankings. The Plackett-Luce model then samples a ranking (or arm) according to the distribution of rankings. This sampled ranking is shown to the user who generates a scalar reward (e.g. dwell time). This is done a certain number of times, and the loss function for the given batch is then optimized by back-propagation. It will be appreciated that the neural network along with the Plackett-Luce model define the policy that is optimized through the reinforcement learning technique described herein.

Figure 2:
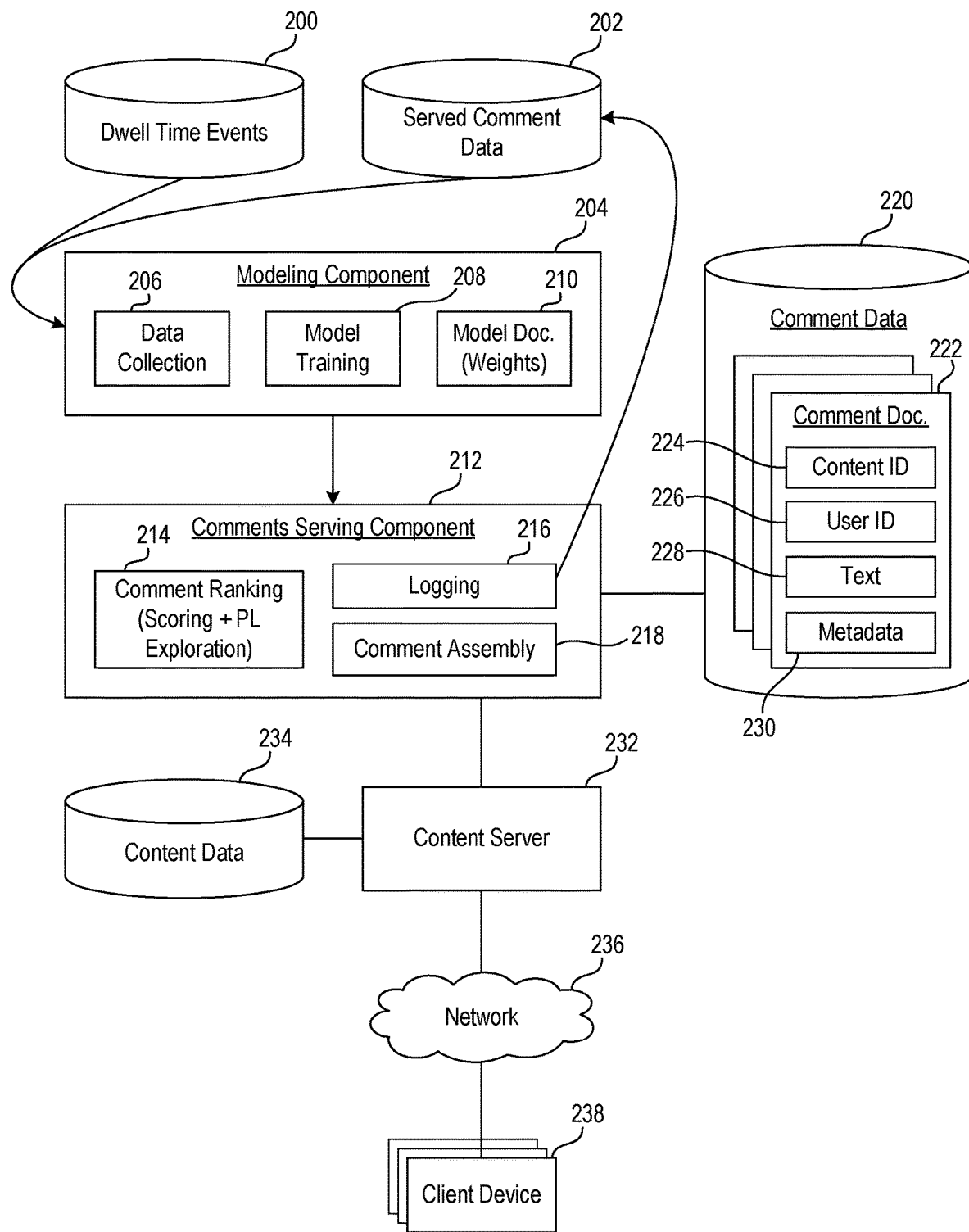
FIG. 2 conceptually illustrates a system for serving comments in an optimized ranking configuration, in accordance with implementations of the disclosure.

FIG. 2 conceptually illustrates a system for serving comments in an optimized ranking configuration, in accordance with implementations of the disclosure. Broadly speaking, the comments system architecture includes two major components: a model modeling component 204 and a comments serving component 212.

The modeling component 204 is configured to execute modeling workflows including data collection 206 to obtain training data, and model training 208 to train (or re-train) the neural network using the training data. The result of the training is to update the parameters of the neural network (e.g. weights, biases), which are stored to a model document 210. By implementing using a model document to store the model parameters, to update the model the system can feed new weights to that document, and when the model is loaded at runtime for each query, then the next ranking call will always load the latest model parameters. The updated model is thus fed to the comments serving component 212, which uses it to provide optimized presentation of comments, e.g. to maximize dwell time while simultaneously providing for explorative learning.

For purposes of reinforcement learning, each training datapoint consists of a comment ranking shown to a user (which can be represented by a comment feature matrix) and the corresponding reward (e.g. dwell time) for that ranking. A logging component 216 logs every comment ranking that is served including the features for each comment. The features are logged at serving time because features like upvote count or time decay will change as time passes. These data events are stored to a served comment data storage 202. When a user sees the ranking, the front-end (e.g. content server 232) logs the dwell time the user spent on that ranking, which is the reward for the reinforcement learning.

While ideal reinforcement learning updates the model after every datapoint, data may not be received that quickly due to processing time. Thus, in some implementations, training data is collected in batches, which are then used to re-train the neural network. By way of example without limitation, training data can be collected in one or two-hour batches, or any other predefined time period. To carry out model re-training, the current model is loaded, and an iteration of reinforcement learning is run on the (e.g. two-hour) batch of training data. Given training data, the neural network parameters (e.g. weights) are updated.

In some implementations, after training, the updated model is evaluated by comparing it to the previous model. Both models can be evaluated on a given number of previous datapoints to determine whether the updated model produces rankings that receive higher rewards on average. If not, then in some implementations, the model can be reverted to its previous state. Generally, the better model will produce probabilities for the given rankings that better correlate with the rewards they received.

After training, the comments serving component uses the updated ranking model to rank comments. More specifically, the comment ranking component 214 implements the updated model weights for the neural network to rank a given set of comments. Broadly speaking, the serving of comments is in response to receiving a request to access content over a network 236 from a client device 238 (e.g. personal computer, laptop, tablet, cellular phone, etc.). The request is transmitted over the network 236 to a content server 232, which serves the requested content to the client device 238 from a content data storage 234. Examples of content include, by way of example without limitation, articles (e.g. news, editorial, blog, etc.), images, audio, videos, posts (e.g. to a social network), or any other text or media content accessed over a network, for which comments may be associated and made viewable to other users over said network.

Further in response to the request to access the content, the comments serving component 212 is engaged to provide comments to serve with the requested content. Thus, the comment ranking component 214 applies the latest model parameters to the neural network to rank comments which are associated with the requested content. A comment data storage 220 stores comments as documents. By way of illustration a comment document 222 includes content ID 224 which identifies the content to which the comment is associated, user ID 226 which identifies the user who generated the comment, text 228 which is the text of the comment, and metadata 230, which includes data pertaining to the comment such as its various features.

Using the content ID, the comments which are associated with the requested content are identified, and ranking of those comments is performed by the comments ranking component 214 in accordance with the methods described herein. Comment assembly component 218 assembles the comments in order of ranking to be served by the content server in conjunction with the requested content. As noted previously, the ranking is logged, and upon serving the ranked comments, the dwell time of the user when viewing these comments is also logged. These datapoints are stored and used to re-train the ranking model at regular intervals.

In some implementations, ranking can be personalized to the requesting user, for example taking into account features associated with the user, such as the user's demographic information, preferences, browsing history, commenting history, etc.

Implementations described above have referenced dwell-time as a reward. However, in some implementations, the reward can be more sophisticated, such as a reward that increases dwell-time while minimizing the overall toxicity.

Furthermore, additional comment features can be utilized such as comment relevance and user-reputation as part of the model.

Figure 3:
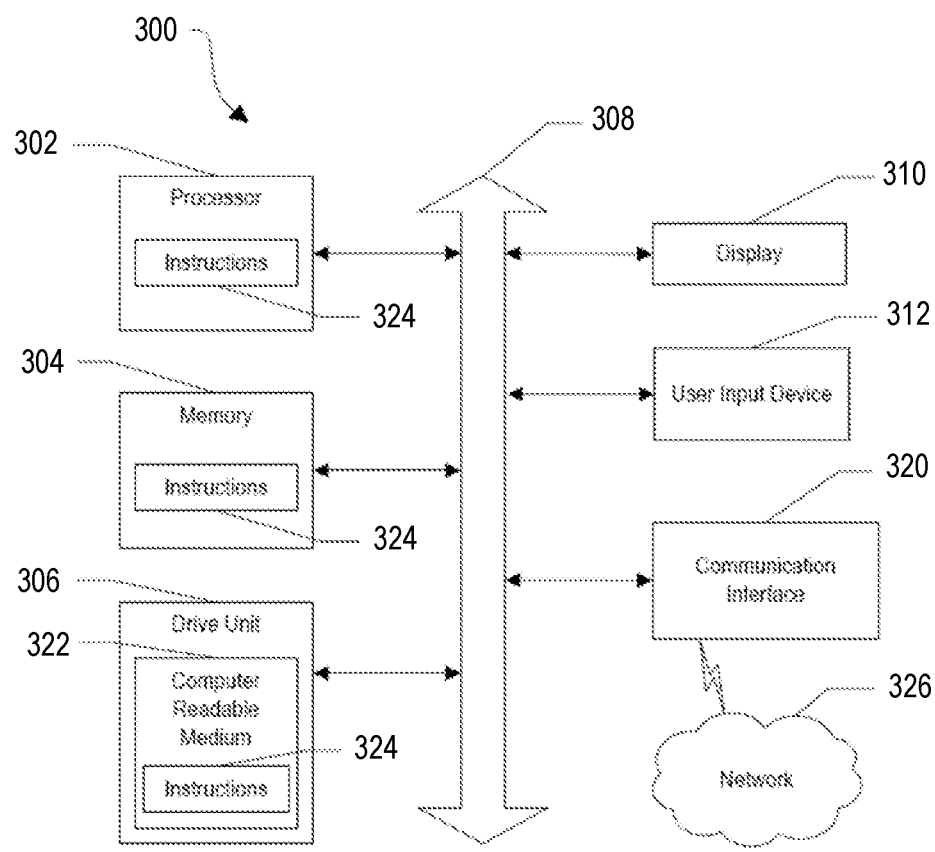
FIG. 3 illustrates an implementation of a general computer system, in accordance with an implementation of the disclosure.

FIG. 3 illustrates an implementation of a general computer system designated 300. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices.

In a networked deployment, the computer system 300 may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics processing unit (GPU), or both. The processor 302 may be a component in a variety of systems. For example, the processor 302 may be part of a standard personal computer or a workstation. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The computer system 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the programmed processor 302 executing the instructions stored in the memory 304. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 300 may further include a display unit 310, such as a liquid crystal display (LCD), an organic light emitting diode (OLED), a flat panel display, a solid state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the computer system 300 may include an input device 312 configured to allow a user to interact with any of the components of system 300. The input device 312 may be a number pad, a keyboard, or a cursor control device, such as a mouse, or a joystick, touch screen display, remote control or any other device operative to interact with the computer system 300.

The computer system 300 may also or alternatively include a disk or optical drive unit 306. The disk drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the computer system 300. The memory 304 and the processor 302 also may include computer-readable media as discussed above.

In some systems, a computer-readable medium 322 includes instructions 324 or receives and executes instructions 324 responsive to a propagated signal so that a device connected to a network 326 can communicate voice, video, audio, images or any other data over the network 326. Further, the instructions 324 may be transmitted or received over the network 326 via a communication port or interface 320, and/or using a bus 308. The communication port or interface 320 may be a part of the processor 302 or may be a separate component. The communication port 320 may be created in software or may be a physical connection in hardware. The communication port 320 may be configured to connect with a network 326, external media, the display 310, or any other components in system 300, or combinations thereof. The connection with the network 326 may be a physical connection, such as a wired Ethernet connection or may be established wirelessly as discussed below. Likewise, the additional connections with other components of the system 300 may be physical connections or may be established wirelessly. The network 326 may alternatively be directly connected to the bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 300 may be connected to one or more networks 326. The network 326 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 326 may include wide area networks (WAN), such as the Internet, local area networks (LAN), campus area networks, metropolitan area networks, a direct connection such as through a Universal Serial Bus (USB) port, or any other networks that may allow for data communication. The network 326 may be configured to couple one computing device to another computing device to enable communication of data between the devices. The network 326 may generally be enabled to employ any form of machine-readable media for communicating information from one device to another. The network 326 may include communication methods by which information may travel between computing devices. The network 326 may be divided into sub-networks. The sub-networks may allow access to all of the other components connected thereto or the sub-networks may restrict access between the components. The network 326 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method, comprising:

using a scoring model to score each comment, of comments, based on corresponding features of the comment;

receiving, from a client device, a request to serve a subset of the comments comprising some but not all of the comments scored using the scoring model;

determining a plurality of possible rankings of the comments associated with a plurality of possible permutations, wherein the plurality of possible rankings of the comments comprises a first possible ranking of the comments associated with a first possible permutation and a second possible ranking of the comments associated with a second possible permutation;

responsive to the request to serve the subset of the comments comprising some but not all of the comments scored using the scoring model, selecting a ranking of the comments that is one permutation from the plurality of possible rankings of the comments, wherein selecting the ranking is in accordance with a probability distribution of the plurality of possible rankings that is based on scores of the comments, wherein the ranking of the comments is associated with increasing a reward at a given time by representing the comments in an order of the ranking, receiving one or more measurable reactions as a scalar reward for the ranking, and updating a ranking mechanism to increase the reward; and serving one or more comments identified by the selected ranking over a network to the client device.

2. The method of claim 1, wherein each permutation from the plurality of possible rankings defines a unique order for at least some of the comments.

3. The method of claim 1, wherein the features include statistics based on at least one of replies, upvotes, downvotes, or age.

4. The method of claim 1, wherein the scoring model includes a neural network.

5. The method of claim 4, wherein updating the scoring model includes adjusting one or more weights of the neural network.

6. The method of claim 1, wherein updating the scoring model is configured to adjust the scoring model to maximize one or more dwell times of comments ordered according to one or more scores as determined by the scoring model.

7. The method of claim 1, wherein the scoring model is configured to provide for a given comment a score indicating a relative contribution of the given comment to an optimized ranking.

8. The method of claim 1, wherein the probability distribution is defined from probabilities of permutations of the plurality of possible rankings, such that a given ranking prioritizing comments predicted to have greater dwell time has a higher probability than a given ranking prioritizing comments predicted to have a lower dwell time, as determined from the scoring of each comment.

9. The method of claim 1, comprising:
determining a value based on the serving the one or more comments; and
updating the scoring model based on the value.

10. The method of claim 1, wherein the request is generated from an access to a content item.

11. The method of claim 1, wherein selecting the ranking includes sequentially defining a multinomial distribution and sampling from the multinomial distribution.

12. The method of claim 9, wherein determining the value includes tracking a quantity of time that the one or more comments are presented at the client device.

13. A non-transitory computer readable medium having program instructions embodied thereon, the program instructions being configured, when executed by a computing device, to cause the computing device to perform operations comprising:
using a scoring model to score each comment, of comments, based on corresponding features of the comment;
receiving a request to serve a subset of the comments;
determining a plurality of possible rankings of the comments associated with a plurality of possible permutations;
responsive to the request, selecting a ranking of the comments that is one permutation from the plurality of possible rankings of the comments, wherein selecting the ranking is in accordance with a probability distribution of the plurality of possible rankings that is based on scores of the comments, wherein the ranking of the comments is associated with increasing a reward at a given time by representing the comments in an order of the ranking, receiving one or more measurable reactions as a scalar reward for the ranking, and updating a ranking mechanism to increase the reward; and
serving one or more comments identified by the selected ranking over a network to a client device,
wherein at least one of:
the operations comprise adjusting the scoring model to maximize one or more dwell times of comments ordered according to one or more scores; or
the probability distribution is defined from probabilities of permutations of the plurality of possible rankings, such that a given ranking prioritizing comments predicted to have greater dwell time has a higher probability than a given ranking prioritizing comments predicted to have a lower dwell time.

14. The non-transitory computer readable medium of claim 13, wherein each permutation from the plurality of possible rankings defines a unique order for at least some of the comments.

15. The non-transitory computer readable medium of claim 13, wherein the features include statistics based on at least one of replies, upvotes, downvotes, or age.

16. The non-transitory computer readable medium of claim 13, wherein the scoring model includes a neural network.

17. The non-transitory computer readable medium of claim 16, wherein updating the scoring model includes adjusting one or more weights of the neural network.

18. The non-transitory computer readable medium of claim 13, wherein the plurality of possible rankings of the comments comprises a first possible ranking of the comments associated with a first possible permutation and a second possible ranking of the comments associated with a second possible permutation.

19. The non-transitory computer readable medium of claim 13, wherein the scoring model is configured to provide for a given comment a score indicating a relative contribution of the given comment to an optimized ranking.

20. A system comprising at least one server computer, the at least one server computer having:
logic for using a scoring model to score each comment, of comments, based on corresponding features of the comment, wherein an objective associated with the scoring model is changed without re-training the scoring model;
logic for receiving a request to serve a subset of the comments;
logic for determining a plurality of possible rankings of the comments associated with a plurality of possible permutations;
logic for, responsive to the request, selecting a ranking of the comments that is one permutation from the plurality of possible rankings of the comments, wherein selecting the ranking is in accordance with a probability distribution of the plurality of possible rankings that is based on scores of the comments, wherein the ranking of the comments is associated with increasing a reward at a given time by representing the comments in an order of the ranking, receiving one or more measurable reactions as a scalar reward for the ranking, and updating a ranking mechanism to increase the reward; and
logic for serving one or more comments identified by the selected ranking over a network to a client device.

* * * * *